(12) United States Patent
Van Den Heuvel

(10) Patent No.: US 8,914,891 B2
(45) Date of Patent: Dec. 16, 2014

(54) PLAYBACK DEVICE WITH CONDITIONAL PLAYBACK

(75) Inventor: Sebastiaan Antonius Fransiscus Arnoldus Van Den Heuvel, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1327 days.

(21) Appl. No.: 12/523,086

(22) PCT Filed: Jan. 10, 2008

(86) PCT No.: PCT/IB2008/050074
§ 371 (c)(1),
(2), (4) Date: Jul. 14, 2009

(87) PCT Pub. No.: WO2008/087567
PCT Pub. Date: Jul. 24, 2008

(65) Prior Publication Data
US 2010/0257611 A1    Oct. 7, 2010

(30) Foreign Application Priority Data
Jan. 15, 2007 (EP) .................... 07100512

(51) Int. Cl.
*G06F 21/00* (2013.01)
*H04L 29/06* (2006.01)
*G06F 21/10* (2013.01)

(52) U.S. Cl.
CPC ........... *H04L 63/10* (2013.01); *H04L 2463/101* (2013.01); *G06F 21/10* (2013.01)
USPC ................. 726/26; 726/31; 380/231; 705/52; 705/59

(58) Field of Classification Search
CPC .... H04L 2463/10; H04L 63/101; G06F 21/10
USPC .................... 726/26–31; 380/231; 705/52, 59
See application file for complete search history.

(56) References Cited

U.S. PATENT DOCUMENTS 6,049,789 A * 4/2000 Frison et al. .................... 705/59
2002/0016775 A1 * 2/2002 Nakagawa ...................... 705/52
(Continued)

FOREIGN PATENT DOCUMENTS

EP   1594033 A2   11/2005
EP   1939783 A2   7/2008

OTHER PUBLICATIONS

Open Mobile Alliance Standard: OMA-TS-DRM-DRM-V2_1-20061128-DRM Specification-Draft Version 2.1, Nov. 28, 2006, Retrieved on Jul. 28, 2008 From the Internet:URL:http://member.openmobilealliance.org/ftp/Public_documents/DRM/2006/0MA-DLDRM-2006-0510R01-INP_Update_of_DRMv2.1_docs.zip.

*Primary Examiner* — Saleh Najjar
*Assistant Examiner* — Peiliang Pan

(57) ABSTRACT

A device for playback (8) of content (2) in accordance with a license (4) comprises a processing unit (3) for accessing the license and for specifying usage information for the content. The processing unit is communicatively connected to a usage indicator (5) for providing a measure of usage and a communication unit (6). Usage information is set by the processing unit to allow usage of the content if the measure of usage has been communicated to a service provider (10) in accordance with instructions derived from the license, else usage of the content is forbidden.

18 Claims, 2 Drawing Sheets

(56) References Cited

U.S. PATENT DOCUMENTS

| | | | |
|---|---|---|---|
| 2003/0084343 A1* | 5/2003 | Ramachandran et al. | 713/201 |
| 2005/0273600 A1* | 12/2005 | Seeman | 713/160 |
| 2006/0041585 A1* | 2/2006 | Ebihara et al. | 707/104.1 |
| 2006/0179058 A1* | 8/2006 | Bram et al. | 707/9 |
| 2008/0027867 A1* | 1/2008 | Forbes et al. | 705/51 |
| 2008/0098384 A1* | 4/2008 | Nagao | 717/171 |

* cited by examiner

PLAYBACK DEVICE WITH CONDITIONAL PLAYBACK

FIELD OF THE INVENTION

The invention relates to the field of consumer devices, and in particular to devices for playback of content in accordance with a license.

BACKGROUND OF THE INVENTION

Digital rights management (DRM) technology serves to control usage of digital contents within usage rules set up by a content owner or by legislation. DRM typically serves to protect content against unauthorized usage, but it also enables a service provider to bind usage rules to content, for example in connection with a business model.

The Marlin DRM system developed by the Marlin Developer Community is an example of a DRM system which provides a platform on which a service provider may set up customized usage rules of specific content. In the Marlin system a license is expressed as code. When determining whether content playback is allowed, the license in executed by the playback apparatus instead of interpreted by it. In Marlin, as well as in other DRM systems, a license to content may be customized for the specific content or type of content.

One option available in Marlin, as well as in other DRM systems, is that it is possible in the license to specify that when content is accessed, this access should be metered. That is, it is possible in the license to specify that a usage measure is recorded when the content is accessed. The usage measure may then be reported to a service provider, such as a metering service indicated in the license. In the Marlin system, it is taken into account that devices may not always be online. Accumulation of the usage measure can be made over time and delivered to the service provider when the service is available.

The inventor of the present invention has appreciated that an improved way of handling the usage measure may be of benefit, and has in consequence devised the present invention.

SUMMARY OF THE INVENTION

The inventor has had the insight that in current DRM systems, including the Marlin system, it is not possible to enforce actual delivery of the usage measure to the service provider. Preferably, the invention alleviates, mitigates or eliminates one or more of the above or other disadvantages singly or in any combination.

According to a first aspect of the present invention there is provided, a device for playback of content, the device comprising:
  a processing unit for accessing a license associated to content and for specifying usage information for the content in accordance with instructions derived from the license; the processing unit being communicatively connected to:
  a usage indicator for providing a measure of usage associated with the content;
  a communication unit for communicating the measure of usage;
wherein the usage information is set by the processing unit to allow usage of the content if the measure of usage has been communicated to a service provider in accordance with instructions derived from the license; and the usage information is set by the processing unit to forbid usage of the content if the measure of usage has not been communicated to the service provider in accordance with instructions derived from the license.

The invention according to the first aspect is particularly but not exclusively advantageous for providing a playback device with conditional playback, in that it is ensured that playback is not feasible unless the usage measure has been communicated to the service provider in accordance with instructions derived from the license. By setting the usage information to allow or forbid usage in dependence upon whether or not the usage measure has been communicated in accordance with the instruction derived from the license, a simple and direct way of ensuring that usage of given content is done in accordance with usage rules as set up by the content owner or content provider. A device may be provided, which on one hand ensures that content can be played back irrespectively of whether or not a permanent connection to the service provider is established, but where it may be ensured that content is only played back in agreement with usage rules as set up by the content owner or content provider.

In an advantageous embodiment, the license may be based on a digital rights language. A flexible means for customizing usage rules to specific content may thereby be provided. The license may be executed by the processing unit so that the setting of the usage information is controlled by the processing unit running the license. The processing unit may provide an environment in which the license may be executed. Specific actions, such as setting of the usage information, initiation of playback, termination of playback, etc. may thereby be controlled by the license.

In an advantageous embodiment, the measure of usage may be updated during playback and the updated measure of usage may be compared with the instructions derived from the license, so that updated usage information may be set to forbid continued playback if the updated measure of usage indicates an amount of consumed content that exceeds an amount of allowed usage as derived from the license. By performing the comparison during playback, playback may begin immediately after a user has requested playback. A user which is allowed to playback content may thereby be provided with a more pleasant experience since the user does not need to wait for the communication to be performed, and for a user which is not allowed to playback content, it may be even more frustrating to have the playback of the content terminated during playback than not having been able to access it in the first place.

In an advantageous embodiment, the license may specify that the usage information is further conditioned upon a registration. By conditioning usage upon a registration a user may be further inclined to conform to usage rules as set up in the license agreement. Moreover, the service provider, content provider, or others may directly and in a simple manner be provided with feedback concerning desired information regarding their customers.

In an advantageous embodiment, the playback of the content may further be conditioned upon that the processing unit has received, has access to or has executed the one or more data objects. By conditioning usage upon the access or execution to an additional data object an even more secure, or customized service may be provided.

In advantageous embodiments, the license may specify conditions which include, but are not limited to: a size of an allowed amount of content and where the measure of usage includes a size of consumed usage of the content, an allowed accumulation time, and where the measure of usage includes a time of consumed usage of the content, an allowed report interval, and where the measure of usage includes a time stamp of the last communication of the measure of usage, an allowed maximum number, and where the measure of usage indicates the number of times the content has been accessed. The processing unit sets the usage information to allow playback if conditions are fulfilled. Such conditions are simple to implement in a device, as well as to understand for a user. A user-friendly and transparent system may thereby be provided.

In an advantageous embodiment, the measure of usage may be made available to the processing unit in a read-only memory of the device. A direct and secure way of accessing the measure of usage may thereby be implemented in the device.

In an advantageous embodiment, the device may further store instructions specifying how the processing unit accesses the measure of usage. The instructions may specify a method of how to access and obtain the desired information including the measure of usage, the method may be called by the license. A simple and direct way of matching a license and a device may thereby be provided.

In an advantageous embodiment, the device forms part of a network domain and where the device is communicatively connected to other one or more devices in the network domain, and where playback of the content on other devices in the network domain is accessible via the device, if the domain shares the same rights. It is an advantage for the user, that he or she is not limited to playback on a specific device in a network domain. A user-friendly system may thereby be provided.

In a second aspect of the invention there is provided a method for playback of content, the method comprising:

accessing a license associated to content and specify usage information for the content in accordance with instructions derived from the license;

providing a measure of usage associated with the content;

wherein the usage information is set to allow usage of the content if the measure of usage has been communicated to a service provider in accordance with instructions derived from the license; and the usage information is set to forbid usage of the content if the measure of usage has not been communicated to the service provider in accordance with instructions derived from the license.

In a third aspect of the invention there is provided a computer readable code arranged for causing a processor to perform the method of the second aspect.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
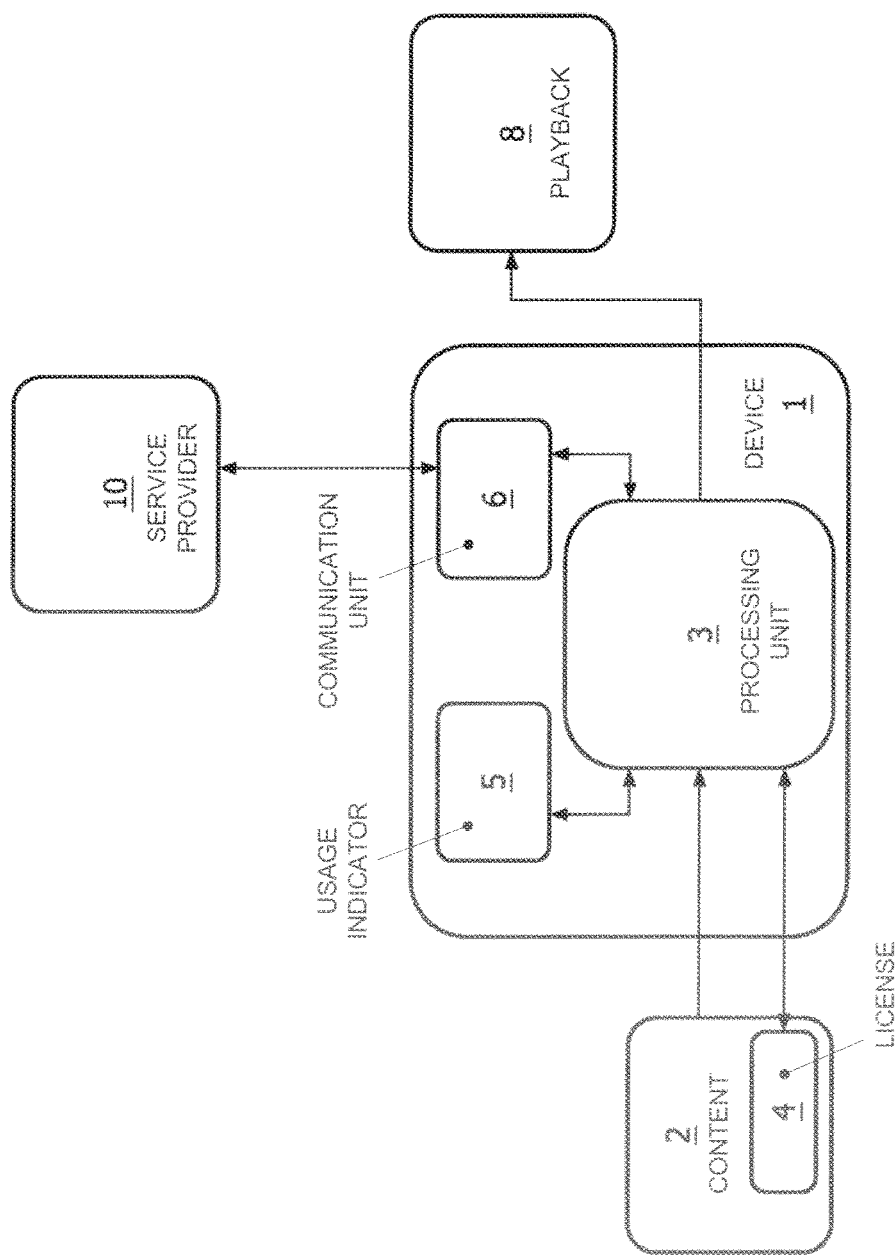
FIG. 1 shows a schematic overview of elements of a device in accordance with an embodiment of the present invention.

FIG. 1 shows a schematic overview of elements of a device 1 in accordance with an embodiment of the present invention. The elements may be elements of a playback device such as a Hard disk player, a computer card, a Blu ray player, a DVD player, a TV-set, a set-top box, a portable media player, etc. The Figure shows elements used by the device to control playback of content 2. A processing unit 3, typically defined in a software or hardware engine is implemented to perform the tasks described in the following in connection with a playback request of the content. In an embodiment, the processing unit may be implemented as a virtual machine.

Embodiments of the invention are based on an authentication system where a license is given to and associated with specific content. The license may in an embodiment be based on a digital rights language where the license includes instructions to be executed by the device instead of interpreted. The license may therefore include one or more lines of computer code to be interpreted by the device. In another embodiment, may the license be a standard or regular license which is interpreted by the device. The license may be executed and/or interpreted the first time the content is to be played back, and the instructions derived from the license may be stored in a memory of the device, or in a memory that can be accessed by the device. Alternatively may the license be accessed each time the content is to be played back. The license may e.g. accompany the content, for example by providing the license on a computer readable medium associated to the content, or possibly on the same computer readable medium as used to provide the content. The license may also be accessed via a communication line, such as via an Internet line, typically via a secure line to an authentication service storing the license.

The license 4 may hold instructions that specify usage information for the content, e.g. conditions under which the content can be played back. These conditions may relate to both legal aspects of the content as well as aspects relating to a business model under which the content is provided. The license may be directed to specific content, e.g. a specific film or to a type of content, e.g. content accessed though or via a given content provider. Alternative measures of linking a license and content may also be provided. Content may be associated to an ID code for identification by the device, as well as by the service provider, or other.

The license may e.g. be coded in binary or language format. The license may include instructions indicating restrictions based on usage information, size or delivery time either as computer code to be executed by the processing unit, or in addition to or as a supplement to computer code. A license may be associated to content or to a registration. In the last example, the license may be interpreted or executed to determine whether the registration is still valid. This can be based partially on the fact regarding whether or not the usage information has been delivered.

In an embodiment may the playback be conditioned upon the availability to the processing unit of one or more data objects. The data objects may include additional settings or code which is needed by the processing unit to correctly execute the necessary steps in order to allow playback of content. Such data objects may be provided to the device in connection with establishing the communication link needed to communicate the measure of usage to the service provider, or in connection with a registration. The data object may include, or may be, executable code that may control the setting of the usage information, so that usage information may only be set to allow playback of the content, if the data object is accessible or if the data object is correctly executed.

Before playback is initiated, or alternatively during playback, the processing unit 3 accesses and consults the license 4 or instructions derived from the license, possibly in accordance with executable instructions of the license, the processing unit moreover accesses a usage indicator 5 for providing a measure of usage associated with the content, and a communication unit 6 for establishing the communication status of the content. The measure of usage, may relate to the amount of data that has been played back, to the number of times the content has been played, etc.

Playback 8 is only allowed if the measure of usage has been communicated to a service provider 7 in accordance with instructions derived from the license. The conditions under which the measure of usage has to be communicated may be dictated by the license.

The usage indicator may in different embodiments be implemented in different ways. In one embodiment, the usage indicator may be implemented either by a general purpose-processing unit or by a dedicated processing unit of the device. The usage indicator includes or is communicatively connected to a memory for recording and storing the measure of usage or parameters used to derived the measure of usage. The memory may be an internal memory or an external memory. The external memory may be accessible via a communication line. The device may operate in accordance with a standard procedure specifically dictating the details concerning the usage measure.

In an embodiment, the processing unit monitors the usage indicator during playback of the content and compares the usage indicator with the instructions derived from the license. In the event that the measure of usage indicates an amount of consumed content that exceeds an amount of allowed usage as derived from the license, the processing unit sets the usage information to forbid continued playback, resulting in that the playback of the content is stopped.

In an example embodiment, the following tasks are performed. A user acquires content for playback, for example video-on-demand. The content is associated to a license, specifying the conditions under which the content may be viewed, for example, that the streamed amount of data is reported to the service provider once a day and that no more than 25 gigabyte of data is streamed per week. The processing unit then consults the usage indicator which has recorded that a given amount of data has been streamed within the last week, and has recorded a timestamp of the last time the measure of usage was communicated to the service provider. The processing unit then compares the retrieved information with the specified conditions. As an example, the streamed amount of data within the last week may be 12 GB which is below the limit, but it has been two days since the measure of usage has been communicated to the service provider. The processing unit then sets the usage information so that playback of the content in question is forbidden. In an embodiment, the user is then informed that in order to play the content, the measure of usage should be communicated to the service provider.

Figure 2:
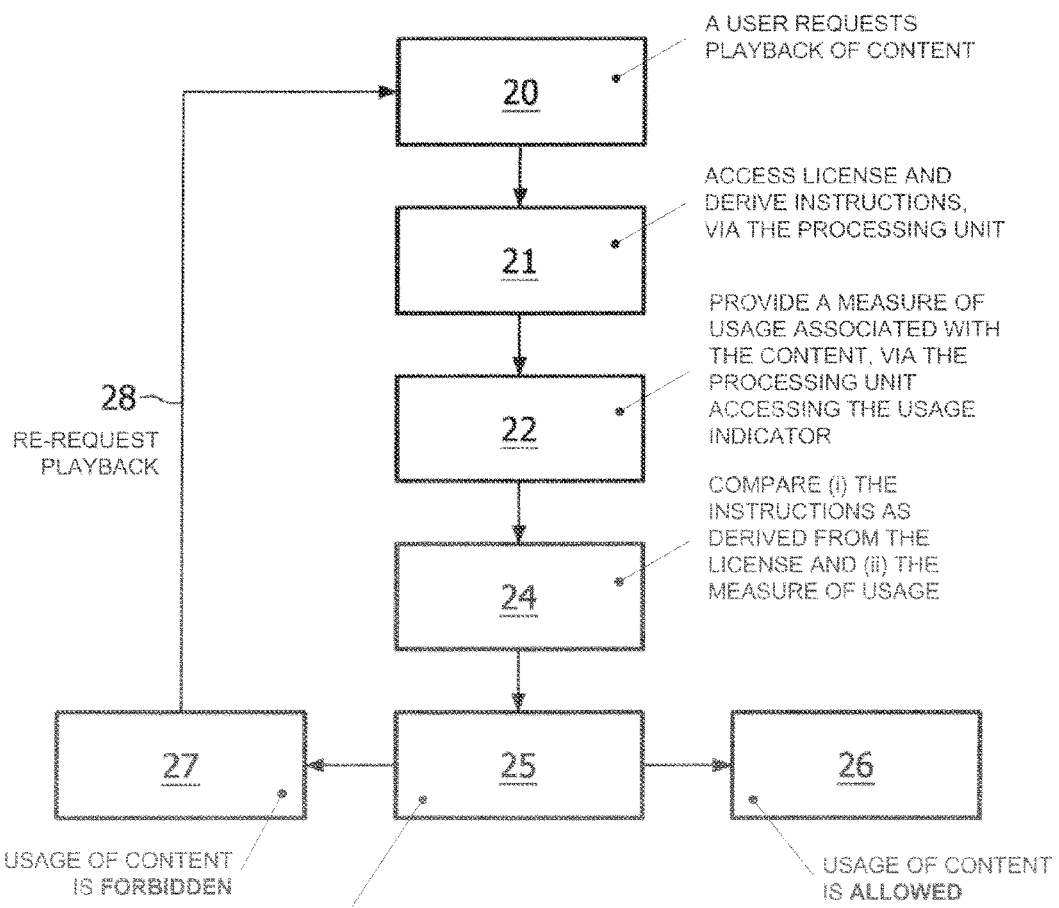
FIG. 2 illustrates an example flow diagram of steps that may be performed by an embodiment of a device for playback of content.

FIG. 2 illustrates an example flow diagram of steps that may be performed by an embodiment of a device for playback of content.

A user requests playback of content 20. As a result, the processing unit accesses the license 21 associated to the content and derives instructions from the license, alternatively, the processing unit consults instructions that have already been derived from the license. A license may specify different types of instructions. In the event the license specify conditional access to the content, where the criterion or condition to be fulfilled is to check whether or not a measure of usage has been communicated to a service provider in accordance with instructions derived from the license, the processing unit accesses the usage indicator 22 for providing the measure of usage associated with the content.

By comparing 24 the instructions as derived from the license and the measure of usage, the processing unit sets the usage information 25 of the content so that usage of the content is allowed 26 if the measure of usage has been communicated to a service provider in accordance with instruction derived from the license; and usage of the content is forbidden 27 if the measure of usage has not been communicated to the service provider in accordance with instruction derived from the license.

In the event that the usage information is set to allow playback, the content may be played back 26 by the device. In the event the usage information is set to forbid playback 27, the user may be informed. The user may as a consequence perform the necessary steps, e.g. communicate the measure of usage to the service provider, and then request playback again 20.

In short the following tasks are performed in connection with the embodiment as illustrated in FIG. 2:
  20: Requests playback of content
  21: Access license and obtain instructions
  22: Access the usage indicator
  24: Compare the instructions and the measure of usage
  25: Set usage information
  26: Playback allowed
  27: Playback forbidden
  28: Re-request playback The license may specify the conditions to be fulfilled in connection with communicating the measure of usage, so that when the device accesses the license, it may derive the conditions to be fulfilled.

In an embodiment, the measure of usage includes a size of consumed usage of the content. The license may in this situation specify a size of an allowed amount of content. For example, the measure of usage records in Mega Bytes (MB) or Giga Bytes (GB) the consumed usage of the content. The license may as an example dictate that 1 GB may be played back before the measure of usage is communicated to the service provider.

In an embodiment, the measure of usage includes a time of consumed usage of the content. The license may in this situation specify an allowed accumulation time. For example, the measure of usage records in seconds the playback time of the content. The license may as an example dictates that 1 hour may be played back before the measure of usage is communicated to the service provider.

In an embodiment, the measure of usage includes a time stamp of the last communication of the measure of usage. The license may in this situation specify an allowed report interval. For example, each time the measure of usage has been communicated to the service provider, the usage indicator records a timestamp. The license may as an example dictate that the allowed report interval is 1 hour.

In an embodiment, the measure of usage includes a number indicating the number of times content, e.g. specific content or content of a specified group, has been accessed or played or moved, or other specific actions. The license may in this situation specify an allowed maximum number. The license may as an example specify that content may accessed or played only once.

The usage indicator may be implemented by the device in a way that is specific to a given type of device, so that different types of devices implement the usage indicator differently.

The measure of usage may in an embodiment be made available to the processing unit, or in the event that the processing unit implements a virtual machine to the virtual machine. For example, the measure of usage may be made available in a read-only memory (ROM) of the device which can be accessed by the processing unit, e.g. the virtual machine, running the license. By providing the measure of usage in a ROM the processing unit may easily communicate with the usage indicator irrespectively of a specific implementation of the usage indicator.

In an embodiment, the device may store instructions specifying how the processing unit can access the measure of usage. For example, the usage indicator may store computer code which when executed by a virtual machine running the license, will return the usage measure and possibly other information, e.g. information on the communication status of the communication unit. Thereby different methods may be made available to the license and the license only needs to call the methods, the specific execution needed in order to obtain the desired information need not be known to the license.

The device may in an embodiment store instruction to be displayed to the user upon request of playback, for example instructions that specify when playback is allowed.

In an example embodiment, a usage indicator records the following measures of usage: the total consumed amount of content for a given content ID, the amount of consumed content since the last report to the service provider, the total playback time, the playback time since the last report to the service provider, the time stamp of the last report to the service provider, and the number of times the content has been accessed.

In accordance with a specific end-user agreement and a given business model a license may be associated to a specific type of content. As an example, a license may specify (in pseudocode) that:

```
ContentID := num;                              // ID of content
ServiceProvider := http://secure.provider.com; // Communication link
Content.total.size := S;                       // Total allowed amount
Report.Interval := I;                          // Max interval
```

The device may, as an example, be programmed to execute the following steps
i) Get content ID
ii) Access the usage indicator for the relevant content ID
iii) Compare the total amount of consumed content for the content ID with the size given in the license
iv) Compare the time stamp of the last report to the service provider with the allowed report interval as given in the license.

If iii) and iv) are fulfilled then ask the user if he or she accepts that a communication link is established to the service provider of the license. If the user accepts, the playback of the content starts concurrently with communicating the current measure of usage to the service provider and update the usage indicator. If the user does not accept, playback of the content without establishing communication link to the service provider.

If one of iii) or iv) are not fulfilled, the user is informed that playback is not possible. The user may e.g. also be informed about what to fulfill in order to be able to access the content.

In other embodiments, the programming required to evaluate the license conditions is distributed as part of the license or registration information.

In other embodiments, other or additional restrictions may be applied so that playback may be made dependent on additional conditions. For example, during communication with the service provider it may be checked if the device has been registered, it may be checked if the communication request falls within a specific time frame, possibly provided by the license, etc.

The device may in embodiments be part of a network domain such as a home network. The device may e.g. be elected to be home server. The device may via the home network be communicatively connected to other one or more devices in the network domain, such as a laptop computer or a TV-set in the home network. Playback of the content on other devices in the network domain may be accessible via the device. In such embodiments, handling of the license and aspects relating to whether or not content can be played back is done by the device, possible on a request received from the other device. Once access to playback of the content is provided, the playback may be free to all playback devices in the home network.

Other security measures, such as encryption of the content, encryption of the license, copy protection of the content, watermarking, ticketing, secure communication between the device and the service provider, secure communication between the device and an authentication service holding the license, and the like, may also be employed by the device.

In an embodiment, the specific measure of usage as recorded by the usage indicator, the specific format of the license, and the communication protocol between the processing unit and the content as well as the communication protocol between the device and the service provider, as well as other parameter or protocols may be specified by a given DRM system, such as the Marlin DRM system.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:
1. A device playback of content, comprising:
a processing unit for accessing a license that is (i) associated to content and (ii) specifies conditional access to the content that includes measures of usage conditions to be fulfilled in connection with communicating actual measures of usage to a service provider, the processing unit further for specifying usage information for the content, to allow usage or to forbid usage, in accordance with instructions to be derived from pseudo code of the license;

a usage indicator communicatively connected to the processing unit, the usage indicator for recording measures of usage associated with the content and providing the recorded measures of usage to the processing unit; and a communication unit communicatively connected to the processing unit, the communication unit for communicating the recorded measures of usage to the service provider, wherein responsive to the processing unit comparing (a) the specified measures of usage conditions in the license according to the instructions derived from the license with (b) the recorded measures of usage, (i) the usage information is set by the processing unit to allow usage of the content if the specified measures of usage conditions have been fulfilled within an allowed report interval and communicated to the service provider in accordance with instructions derived from the license, and (ii) the usage information is set by the processing unit to forbid usage of the content if the specified measures of usage conditions have not been fulfilled within the allowed report interval and communicated to the service provider in accordance with instructions derived from the license, wherein the recorded measures of usage include total consumed amount of content for a given content ID, an amount of consumed content since a last report to the service provider, a total playback time of the content since the last report to the service provider, a time stamp of the last report to the service provider, and a number of times the content has been accessed.

2. The device according to claim 1, wherein the processing unit implements a virtual machine for governing the license and instructions associated to the license.

3. The device according to claim 1, wherein the license is based on a digital rights language.

4. The device according to claim 3, wherein the license is executed by the processing unit so that the setting of the usage information is controlled by the processing unit running the license.

5. The device according to claim 1, wherein the license specifies that the usage information is further conditioned upon a registration.

6. The device according to claim 1, wherein the processing unit in order to allow usage of the content is further dependent upon having received or having access to one or more data objects.

7. The device according to claim 6, wherein the processing unit in order to allow usage of the content is further dependent upon having executed the one or more data objects.

8. The device according to claim 1, wherein the processing unit during playback of the content updates and monitors the measures of usage and compares the updated measures of usage with the instructions derived from the license, and where the processing unit sets the usage information to forbid continued playback if the updated measures of usage indicates an amount of consumed content that exceeds an amount of allowed usage as derived from the license.

9. The device according to claim 1, wherein the measures of usage includes a size of consumed usage of the content and the license specifies a size of an allowed amount of content, and where the processing unit sets the usage information to allow playback if the measures of usage indicates that the size of consumed usage of the content is less than the size of allowed amount content.

10. The device according to claim 1, wherein the measures of usage includes a time of consumed usage of the content and the license specifies an allowed accumulation time, and where the processing unit sets the usage information to allow playback if the measures of usage indicates that the time of consumed usage of the content is less than the allowed accumulation time.

11. The device according to claim 1, wherein the measures of usage includes a time stamp of the last communication of the measures of usage and the license specifies an allowed report interval, and where the processing unit sets the usage information to allow playback if the measure of usage indicates a time stamp in accordance with the allowed report interval.

12. The device according to claim 1, wherein the measures of usage includes a number of times the content has been accessed and the license specifies an allowed maximum number, and where the processing unit sets the usage information to allow playback if the measure of usage indicates that the content has been accessed less times than the allowed maximum number.

13. The device according to claim 1, wherein the measures of usage are made available to the processing unit in a read-only memory of the device.

14. The device according to claim 1, wherein in addition to the measures of usage the device stores instructions that specifies how the processing unit accesses the measures of usage.

15. The device according to claim 1, further storing instructions to be presented to a user that specifies when playback is allowed.

16. The device according to claim 1, wherein the device is part of a network domain and where the device is communicatively connected to other one or more devices in the network domain, and where playback of the content on other devices in the network domain is accessible via the device.

17. A method for playback of content by a device, the method comprising:

accessing, via a processing unit, a license that is (i) associated to content and (ii) specifies conditional access to the content that includes measures of usage conditions to be fulfilled in connection with communicating actual measures of usage to a service provider, and specifying, via the processing unit, usage information for the content, to allow usage or to forbid usage, in accordance with instructions to be derived from pseudo code of the license;

providing, via the processing unit accessing a usage indicator having recorded measured of usage associated with the content, the recorded measures of usage associated with the content; and communicating, via the processing unit accessing a communication unit, the recorded measures of usage to the service provider, wherein responsive to comparing, via the processing unit, (a) the specified measures of usage conditions in the license according to the instructions derived from the license with (b) the recorded measures of usage, (i) the usage information is set, via the processing unit, to allow usage of the content if the specified measures of usage conditions have been fulfilled within an allowed report interval and communicated to the service provider in accordance with instructions derived from the license; and (ii) the usage information is set, via the processing unit, to forbid usage of the content if the specified measures of usage conditions have not been fulfilled within the allowed report interval and communicated to the service provider in accordance with instructions derived from the license, wherein the recorded measures of usage include total consumed amount of content for a given content ID, an amount of consumed content since a last report to the service provider, a total playback time of the content since the last report to the service provider, a time stamp of the last report to the service provider, and a number of times the content has been accessed.

18. A non-transitory computer readable medium embodied with computer readable code arranged for causing a processor to perform the method of claim 17.

\* \* \* \* \*